Nov. 30, 1965 R. W. BOZEMAN 3,221,188
PULSE GENERATING MEANS UTILIZING DELAY TIMED
MASTER TO CONTROL DELAY TIMED SLAVES
Filed Dec. 14, 1964 3 Sheets-Sheet 1

INVENTOR
RICHARD W. BOZEMAN

BY
ATTORNEY

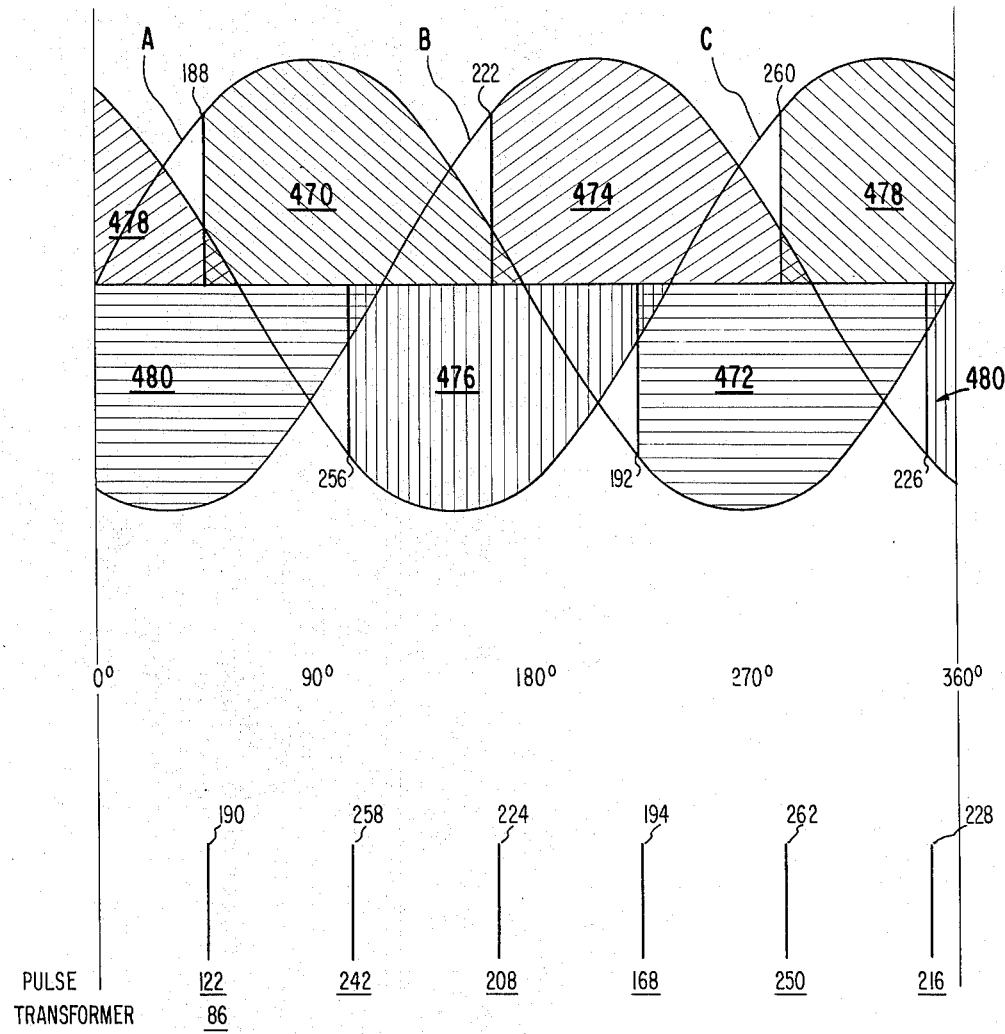

United States Patent Office 3,221,188
Patented Nov. 30, 1965

3,221,188
PULSE GENERATING MEANS UTILIZING DELAY TIMED MASTER TO CONTROL DELAY TIMED SLAVES
Richard W. Bozeman, Shirley, Ill., assignor to General Electric Company, a corporation of New York
Filed Dec. 14, 1964, Ser. No. 418,217
6 Claims. (Cl. 307—88.5)

This invention relates to a pulse generating network useful for creating a series of pulses having a predetermined timed relationship with respect to each other. More specifically, it relates to a pulse generating network wherein the generation of the first pulse in a master pulse generating circuit controls the sequential generation of a plurality of pulses in a predetermined relationship in a purality of slave pulse generating circuits.

Large amounts of electrical power are most conventionally transmitted by three-phase A.C. power systems. It is therefore necessary to rectify this A.C. voltage if a D.C. supply is required by a large load. Frequently it is desirable to supply a variable D.C. voltage to the load. If so, ignitrons are frequently used as the current rectifying means. Ignitrons conduct in only one direction and only after they are fired by applying a signal or pulse to an ignitor electrode. When power is supplied to a D.C. load from a three-phase A.C. power system, it is desirable to supply equal amounts of power from each of the three phases. Furthermore, since transformers are conventionally used in A.C. power systems it is desirable that each phase supply power for like portions of each positive and negative half cycle. Since each ignitron will conduct in only one direction, it is necessary to have two ignitrons per phase, one to conduct during the positive half cycle and another to conduct during the negative half cycle. The six ignitrons which are therefore required to supply a variable D.C. voltage from a three-phase A.C. power system each require a pulse to be applied to their ignitor once during each cycle to start their conduction.

It is an object of this invention to provide a pulse generating network which will produce a sequence of pulses in a predetermined timed relationship.

It is an object of this invention to provide a pulse generating network which will produce a timed sequence of pulses in response to the generation of a first master pulse.

It is another object of this invention to provide a pulse generating network including a cascade arrangement of a plurality of solid state combined time delay and slave pulse generating circuits, each of which produces one and more pulses so as to provide a sequence of pulses in a predetermined timed relationship.

It is a further object of this invention to provide a solid state pulse generating network including a master pulse generating circuit, and slave pulse generating circuits which will generate a sequence of pulses in a predetermined timed relationship in response to the generation of a master pulse in the master pulse generating circuit.

These objects are accomplished in accordance with this invention, in one form thereof, by providing a pulse generating network comprising a master pulse generating circuit and a cascade arrangement of several slave pulse generating circuits. A cascade arrangement of several combined time delay and slave pulse generating circuits are controlled by the pulse output of the master pulse generating circuit. The pulse generating means include either a transistor in series with a pulse transformer primary winding, or a silicon controlled rectifier in series with a pulse transformer primary winding. By adjusting the time delay provided by the time delay circuit it is possible to provide a series of pulses from the slave pulse generating circuits which have a predetermined timed relationship.

Other objects and further details of which is believed to be novel in the invention will be clear from the following description and the claims taken with the accompanying drawings wherein:

FIG. 3 is a diagram of the supply voltage wave form for the circuit shown in FIGS. 1 and 2, and a pictorial representation of the timed relationship of the pulses generated in the pulse generating network shown in FIG. 1.

Figure 1:
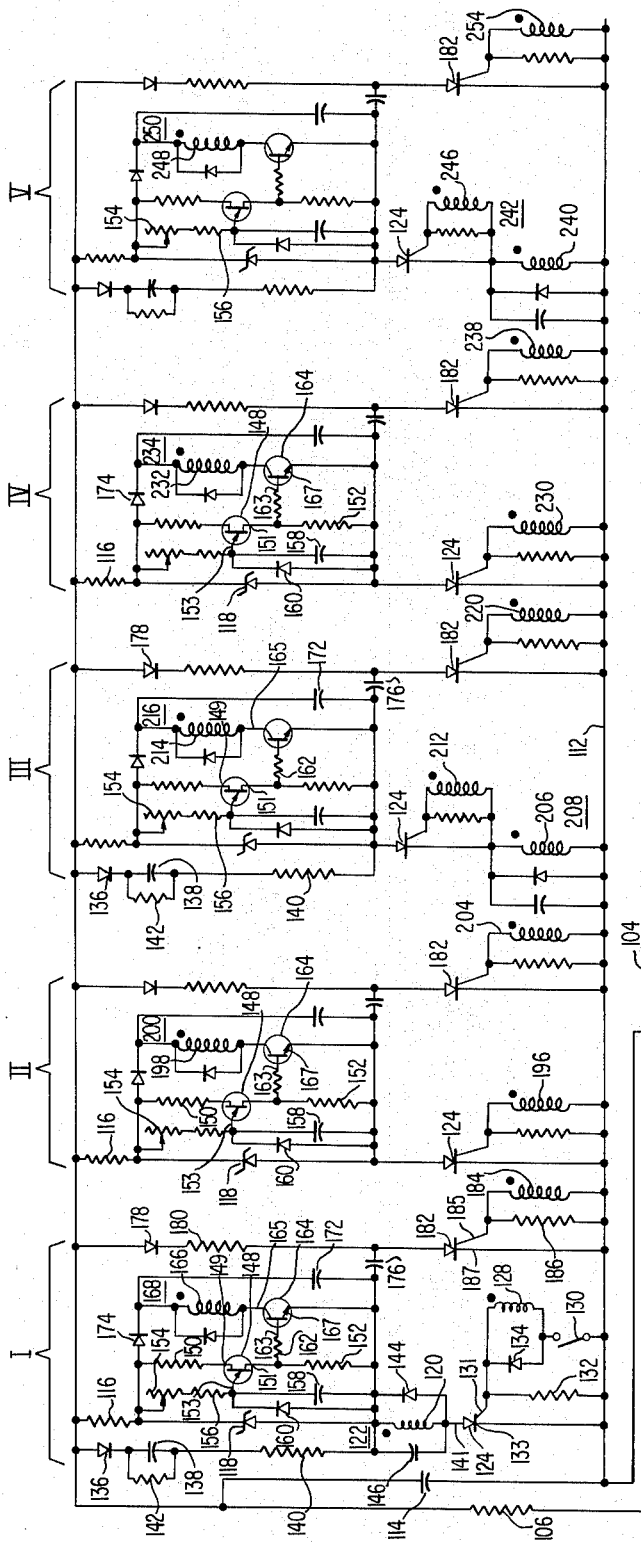
FIG. 1 is a circuit diagram of a pulse generating network comprising a master pulse generating circuit and a plurality of slave pulse generating circuits.
Figure 1:
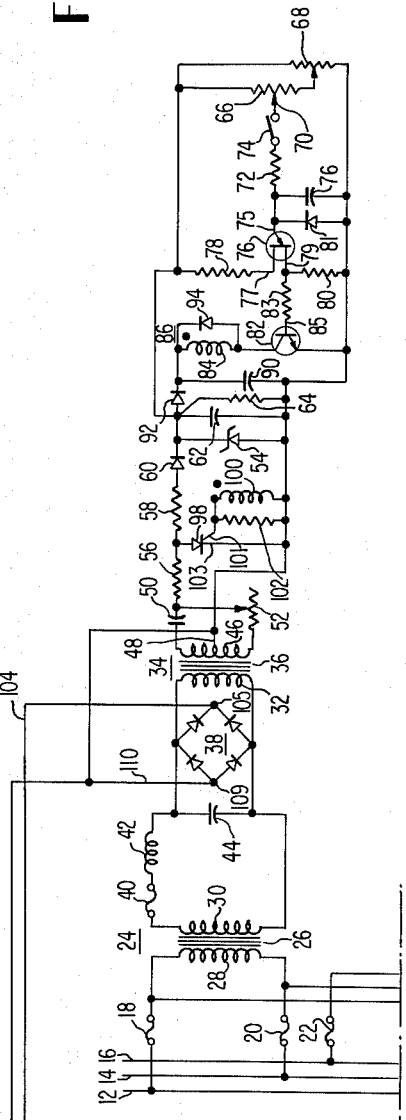

Referring to FIG. 1, the operation of a pulse generating network constructed in accordance with this invention will be described. The pulse generating network is energized by one phase of a three-phase A.C. supply The three-phase A.C. supply is shown as lines 12, 14, and 16. Power for the pulse generating network, which comprises several pulse generating circuits and related control circuits, is obtained from the lines 12 and 14 through fuses 18 and 20, respectively. A third fuse 22 is provided for obtaining power from line 16. An isolation and voltage transformation transformer 24, having a magnetic core 26, is provided to isolate the pulse generating network from the lines and to provide any desired voltage transformation. The primary winding 28 of transformer 24 is connected through fuses 18 and 20 to lines 12 and 14. The secondary winding 30 of transformer 24 is connected to energize the primary winding 32 of a second isolation and voltage transformation transformer 34, and a full wave bridge rectifier 38. Transformer 34 has a magnetic core 36. A fuse 40 and filter choke 42 are connected in series between the secondary winding 30 and the bridge 38. Smoothing capacitor 44 is connected in parallel with the input to the bridge rectifier 38.

A secondary winding 46 of transformer 32 energizes a phase shift network which functions to match the phase relationship of the voltage applied to the pulse generating network to that applied to the load controlled by the pulse generating network. Phase shift of the load voltage depends, of course, on the load power factor. The secondary winding 46 is provided with a center tap 48. The phase shift network comprises a capacitor 50 and a rheostat 52. The phase shift is adjusted by varying the resistance of the rheostat 52. This phase shift network supplies power to a master pulse generating circuit which is shown connected to the center tap 48 of winding 46 and to the junction between the capacitor 50 and the rheostat 52.

The D.C. operating voltage supplied to the master pulse generating circuit is primarily derived from a Zener diode 54 which is connected to the phase shift network through a resistor 56, a second resistor 58, and a diode 60. A capacitor 62 and a bleed resistor 64 are connected in parallel with the Zener diode 54 to absorb or suppress any transients which might appear across the Zener diode. The Zener diode 54 breakdown voltage is the supply voltage for a unijunction transistor (UJT) connected as a relaxation oscillator. The relaxation oscillator or some other pulse forming means develops a pulse at a time controlled by one or more per cent current control circuits and a switching device. One of these per cent current control circuits is shown as comprising potentiometers 66 and 68. A tap 70 of potentiometer 66 is connected in series with a resistor 72 through a normally open switch 74. A capacitor 76 along with the combined resistance of resistor 72 and the resistances of potentiometers 66 and 68 appearing between the resistor 72 and diode 60, form an R-C series timing circuit. This timing circuit determines the rate of rise of the voltage applied to the emitter 75 of a UJT 76, after switch 74 has been closed to initiate operation of the master pulse circuit. Switch 74 may be a solid state switching device or a pair of relay contacts for example. UJT 76 is the basic element of the relaxation oscillator. The second base 77 of UJT 76 is connected to diode 60 through a resistor 78. The value of this resistor is chosen so as to stabilize the frequency of the relaxation oscillator with respect to temperature. The first base 79 of UJT 76 is connected to the negative terminal of Zener diode 54 through a resistor 80.

When the voltage appearing across capacitor 76 reaches a predetermined value after a predetermined time delay, UJT 76 conducts from emitter 75 to first base 79, discharging capacitor 76 through resistor 80. Ringing of the capacitor 76 after conduction has begun through UJT 76 is prevented by diode 81 which is connected in parallel with capacitor 76. The voltage appearing across resistor 80 due to the discharge of capacitor 76 is applied to the base 85 of a transistor 82 through a resistor 83. This voltage is sufficient to cause transistor 82 to conduct through a primary winding 84 of a pulse transformer 86. Transistor 82 is the primary unit of an amplifier which is utilized to amplify the power level of the output pulse of UJT 76 which appears across resistor 80. A capacitor 90 is charged to the Zener voltage of Zener diode 54 through a diode 92. Conduction of transistor 82, causes capacitor 90 to be discharged through the primary winding 84 of pulse transformer 86, thereby creating a pulse in the primary winding 84. The capacitor 90 is chosen to store sufficient energy such that when the energy is supplied to the primary winding 84 as a pulse, a pulse of required magnitude is created in secondary windings of the transformer 86 without the use of a magnetic core. If a magnetic core is used instead of an air core, the transistor amplifier which includes transistor 82 could be eliminated, and the transformer primary winding 84 substituted for the resistor 80 which is in series with the first base 79 of UJT 76. A diode 94 is connected in parallel with the primary winding 84 to protect the transistor 82 from destructive transients.

Pulse transformer 86 is provided with two secondary windings, one of which starts the sequential generation of pulses in time delay slave pulse circuits, and the other of which de-energizes the master pulse circuit which has just been described. The pulse generating network to be further described includes many pulse transformers, each of which has several secondary windings. To aid in the understanding of the pulse generating network the numerals identifying the pulse transformers are located adjacent the primary windings, while the secondary windings are physically positioned at the most convenient location in the pulse generating network circuit diagram. Each time a secondary winding is introduced in the following portion of the specification, the pulse transformer of which it is a part will be indicated. Also, the dot convention will be used to indicate the instantaneous polarities of the primary and secondary windings of all pulse transformers.

After a pulse has been formed in pulse transformer 86, the master pulse circuit has served its purpose and it is necessary to de-energize it for the remainder of the voltage cylce. The master pulse circuit is de-energized by turning "on" silicon controlled rectifier (SCR) 98, thereby removing voltage from the Zener diode 54 by virtue of the low voltage drop across SCR 98 when in the "on" state. A first secondary winding 100 of pulse transformer 86 is connected between the gate 101 and cathode 103 of SCR 98. As previously discussed, conduction of transistor 82 causes a pulse to flow through the primary winding 84 of pulse transformer 86, which in turn causes a pulse to be induced in the secondary winding 100. This pulse fires SCR 98, thereby removing the voltage from the master pulse circuit for the remainder of the voltage cycle. A resistor 102 is connected in parallel with secondary winding 100 to improve the firing characteristics of SCR 98.

A pulse in pulse transformer 86 primary winding 84 not only de-energizes the master pulse circuit, but it also starts the sequential operation of several time delay slave pulse circuits. These slave pulse circuits, which are indicated by the Roman numerals I through V, are energized by the full wave bridge rectifier 38. The positive output terminal 105 of the bridge rectifier 38 is connected by lead 104 to a current limiting resistor 106. The current limiting resistor 106 is in turn connected to a positive bus 108 which supplies power to the slave pulse circuits. The negative output terminal 109 of the bridge rectifier 38 is connected by a lead 110 to a negative bus 112 which is connected to the slave pulse circuits. The output of the bridge rectifier 38 charges a capacitor 114 which is connected between the positive bus 108 and the negative bus 112. A cascade arrangement of the five time delay slave pulse circuits I to V is provided for controlling the formation of a series of sequential pulses. All of these slave pulse circuits are similar in that they include UJT relaxation oscillators similar to the one previously discussed with respect to the master pulse circuit.

Referring to the time delay slave pulse circuit indicated by the Roman numeral I, a resistor 116, a Zener diode 118, a primary winding 120 of a pulse transformer 122, and an SCR 124 are connected in series between positive bus 108 and negative bus 112. A secondary winding 128 of pulse transformer 86 and a normally open switch 130 are connected in series between the gate 131 and cathode 133 of SCR 124. The normally open switch 130 may be a solid state switching device or a pair of normally open relay contacts. To initiate operation of the slave pulse circuit I in response to a pulse from the master pulse circuit, the normally open switch 130 must be closed. The next succeeding pulse generated in pulse transformer 86 will cause a pulse to be formed in secondary winding 128 which will turn on SCR 124. Resistor 132 aids in improving the firing characteristics of SCR 124 and in shaping this pulse. Diode 134 is provided to prevent ringing in the secondary winding 128, and also prevents the cathode 133 from ever becoming positive with respect to the gate 131 which might damage the gate to cathode junction of SCR 124. Conduction through SCR 124 will result in a pulse being formed in the primary winding 120 of pulse transformer 122. A series circuit comprising a diode 136, a capacitor 138, and a resistor 140 extends between the positive bus 108 and the anode 141 of SCR 124. This circuit is provided to increase the amplitude of the pulse formed in the primary winding 120 of pulse transformer 122. Resistor 142 is provided to discharge capacitor 138 when the pulse generating network is de-energized. A diode 144 and a capacitor 146 are connected in parallel with the primary winding 120 to aid in shaping the pulse formed in winding 120.

Conduction in SCR 124 also energizes a time delay circuit comprising a UJT relaxation oscillator. When SCR 124 conducts a voltage equal to the Zener breakdown voltage appears across Zener diode 118. A UJT 148 has its bases 149 and 151 connected through a pair of resistors 150 and 152, respectively, across the Zener diode 118. The voltage on the emitter 153 of UJT 148 is determined by an R-C series timing circuit which is also connected across the Zener diode 118. The time constant of the R-C circuit which comprises a potentiometer 154, a resistor 156, and a capacitor 158 is varied by adjusting the resistance of the potentiometer 154. When the capacitor 158 has been charged to a predetermined voltage, after a predetermined time delay, through potentiometer 154 and resistor 146, it is discharged through the second base 151 of UJT 148 and resistor 152. A diode 160 is connected in parallel with capacitor 158 to prevent the emitter of UJT 148 from ever going negative with respect to its base 151, which would likely result in destruction of the UJT.

A portion of this discharge current will also flow through a resistor 162 to the base 163 of a transistor 164. Transistor 164 is the principal element of an amplifier, and functions similarly to transistor 82 previously discussed with respect to the master pulse generating circuit. This current flow to the base 163 will cause transistor 164 to conduct from its collector 165 to its emitter 167, whereby a pulse of current will flow through a primary winding 166 formed on a pulse transformer 168. This pulse of current will be predominantly due to the discharge of a capacitor 172 which is initially charged to the Zener voltage of Zener diode 118 through a diode 174. When a pulse has been formed in the primary winding 166 of pulse transformer 168, and in the primary winding 120 of pulse transformer 122, time delay slave pulse circuit I has served its purpose, and it is now necessary to stop conduction through SCR 124.

Conduction of SCR 124 is terminated by first charging a capacitor 176 through a diode 178, a resistor 180, primary winding 120 and SCR 124 when it is conducting. The charge on capacitor 126 is such that the positive polarity is at the junction of capacitor 176 and resistor 180. Connected between this junction point and the negative bus 112 is an SCR 182. When the pulse is created in the primary winding of pulse transformer 168, a pulse is also generated in its secondary winding 184 which is connected between the gate 185 and cathode 187 of SCR 182. The pulse in secondary winding 184 turns on SCR 182. Conduction of SCR 182 causes capacitor 176 to be discharged through SCR 124 in the reverse direction, thereby turning it off. Resistor 180 is of sufficiently high impedance such that it will not permit a sufficient amount of current to flow through SCR 182 to sustain its conduction, and therefore SCR 182 is also shut off. A resistor 186 is connected in parallel with the gate 185 and cathode 187 of SCR 182 to improve the firing characteristics of SCR 182.

Summarizing with respect to time delay slave pulse circuit I, it is seen that a pulse has been created in the primary windings 122 and 166 of pulse transformers 122 and 168, respectively. The time delay provided by the UJT oscillator including UJT 148 is adjusted to 8.3 milliseconds which corresponds to 180° of a 60-cycle wave. Therefore, the pulses created in the secondary windings of pulse transformer 168 lag those created in the secondary windings of pulse transformer 122 by 180° of a 60-cycle wave.

Referring now to FIG. 3, the relationships of the pulses created in pulse transformers 86, 122, and 168 will be understood. Sinusoidal wave A represents the voltage appearing between lines 12 and 14. Similarly, wave B represents the voltage appearing between lines 14 and 16, and wave C represents the voltage appearing between lines 16 and 12. Assuming that transistor UJT 72 begins to conduct at point 188 on wave A, pulses will be created in transformers 86 and 122 at that instant. The pulses formed in transformer 86 and 122 are represented by the line 190. The lines representing pulses carry below them the identifying numerals of the transformer in which they are formed. The UJT relaxation oscillator in stage I provides an 8.33 millisecond time delay as previously discussed, and therefore a pulse is formed in pulse transformer 168, 180° after point 188 on wave A, or at point 192. This pulse is represented by line 194 in FIG. 3.

Referring again to FIG. 1, it will be seen that stages II through V are substantially the same as the previously discussed stage I. Stages II and IV differ from stages I, III, and V in that a pulse transformer primary winding is not included in series with the Zener diode and the SCR, as is for instance primary winding 120 of pulse transformer 122 in stage I. The circuit components of stages II through V with the exception of the pulse transformer windings are substantially the same as those in stage I, and therefore the components of these stages bear numerals corresponding to the numerals assigned to the components in stage I. Since the pulse transformer windings are associated with different pulse transformers and will be extensively discussed, they will bear individual identifying numerals.

In stage II a secondary winding 196 formed on pulse transformer 122 is connected between the gate 131 and cathode 133 of SCR 124. Potentiometer 154 is adjusted to provide a time delay of 5.55 milliseconds or 120° between the firing of SCR 124 and conduction of UJT 148 and transistor 164. Conduction of transistor 164 causes a pulse to be formed in a primary winding 198 of a pulse transformer 200. A secondary winding 203 of pulse transformer 200 is connected between the gate 185 and cathode 187 of SCR 182 to shut off SCR 124 in stage II.

Referring now to stage III, SCR 124 is connected in series with a primary winding 206 of a pulse transformer 208. A secondary winding 212 of pulse transformer 200 of stage II is connected between the gate 131 and cathode 133 of SCR 124. A pulse in secondary winding 212 turns on SCR 124 thereby forming a pulse in the primary winding 206 of pulse transformer 208. Potentiometer 154 is adjusted to provide a time delay of 8.33 milliseconds or 180° between the firing of SCR 124 and conduction of UJT 148 and transistor 164. A pulse is formed in a primary winding 214 of a pulse transformer 216 when transistor 164 conducts. A secondary winding 220 of pulse transformer 216 is connected between the gate 185 and cathode 187 of SCR 182. When a pulse is formed in pulse transformer 216, SCR 182 conducts, and as previously discussed with respect to stage I, SCR 124 is shut off.

Referring again to FIG. 3, the relationship of pulses created in pulse transformers 206 and 216 in stage III with respect to the supply voltage wave forms will be understood. Due to the time delay of 5.55 milliseconds or 120° in stage II, the pulse formed in pulse transformer 208 lags the pulse formed in pulse transformer 122 in stage I by 120°. The pulse in pulse transformer 208 therefore occurs at point 222 on wave B. This pulse is represented by line 224. Due to the time delay of 8.33 milliseconds or 180° in stage III, the pulse in pulse transformer 216 lags the pulse in pulse transformer 206 by 180°. The pulse in pulse transformer 216 occurs at point 226 on wave B. This pulse is represented by line 228.

Referring again to FIG. 1, in stage IV a secondary winding 230 formed on pulse transformer 122 in stage I is connected between the gate 131 and cathode 133 of SCR 124. Potentiometer 154 is adjusted to provide a time delay of 2.8 milliseconds or 60° between the firing of SCR 124 by a pulse appearing in secondary winding 230 and the conduction of UJT 148 and transistor 164. Conduction of transistor 164 causes a pulse to be formed in a primary winding 232 of a pulse transformer 234. A secondary winding 238 of pulse transformer 234 is connected between the gate 185 and cathode 187 of SCR 182. When a pulse is formed in pulse transformer 234 SCR 182 conducts and as previously discussed with respect to stage I, SCR 124 is shut off.

Referring now to stage V, SCR 125 is connected in series with a primary winding 240 of a pulse transformer 242. A secondary winding 246 of pulse transformer 234 is connected between the gate 131 and cathode 133 of SCR 124. A pulse in secondary winding 246 turns on SCR 124 thereby forming a pulse in the primary winding 240 of pulse transformer 242. Potentiometer 154 is adjusted to provide a time delay of 8.33 milliseconds or 180° between the firing of SCR 124 by a pulse appearing on secondary winding 246 and conduction of UJT 148 and transistor 164. A pulse is formed in a primary winding 248 of a pulse transformer 250 when transistor 164 conducts. A secondary winding 254 of pulse transformer 250 is connected between the gate 185 and cathode 187 of SCR 182. When a pulse is formed in pulse transformer 250, SCR 182 conducts, and as previously discussed with respect to stage I, SCR 124 is shut off.

Referring again to FIG. 3, the relationship of pulses created in pulse transformers 242 and 250 in stage V with respect to the supply voltage wave forms will be understood. Due to the time delay of 2.8 milliseconds or 60° in stage IV, the pulse formed in pulse transformer 242 lags the pulse formed in pulse transformer 122 in stage I by 60°. The pulse in pulse transformer 242 therefore occurs at point 256 on wave C. This pulse is represented by the line 258. Due to the time delay of 8.33 milliseconds or 180° in stage V, the pulse in pulse transformer 250 lags that in pulse transformer 242 by 180°. The pulse in pulse transformer 250 occurs at point 260 on wave C. This pulse is represented by line 262.

By providing additional secondary windings on some of the pulse transformers, it is possible to provide a series of six pulses, all of which are spaced by 2.8 milliseconds or 60°. Referring again to FIG. 3, it will be seen that a series of six pulses, all of which are spaced by 2.8 milliseconds or 60° are shown. Referring to FIG. 3, pulse transformers 122 and 168 in stage I provide two pulses, represented by the lines 190 and 194 respectively, which are spaced by 180°. Pulse transformers 208 and 216 in stage III provide two pulses which, as represented by the lines 224 and 228, respectively, are spaced from each other by 180°. Pulse transformers 242 and 250 in stage V provide two pulses, which are represented by the lines 258 and 262, respectively, which are also spaced from each other by 180°. The first pulse formed in stage II is spaced 120° by the time delay of stage II from the first pulse formed in stage I. Similarly, the first pulse formed in stage V follows the first pulse formed in stage I by 60°, the time delay being provided by stage IV.

Figure 2:
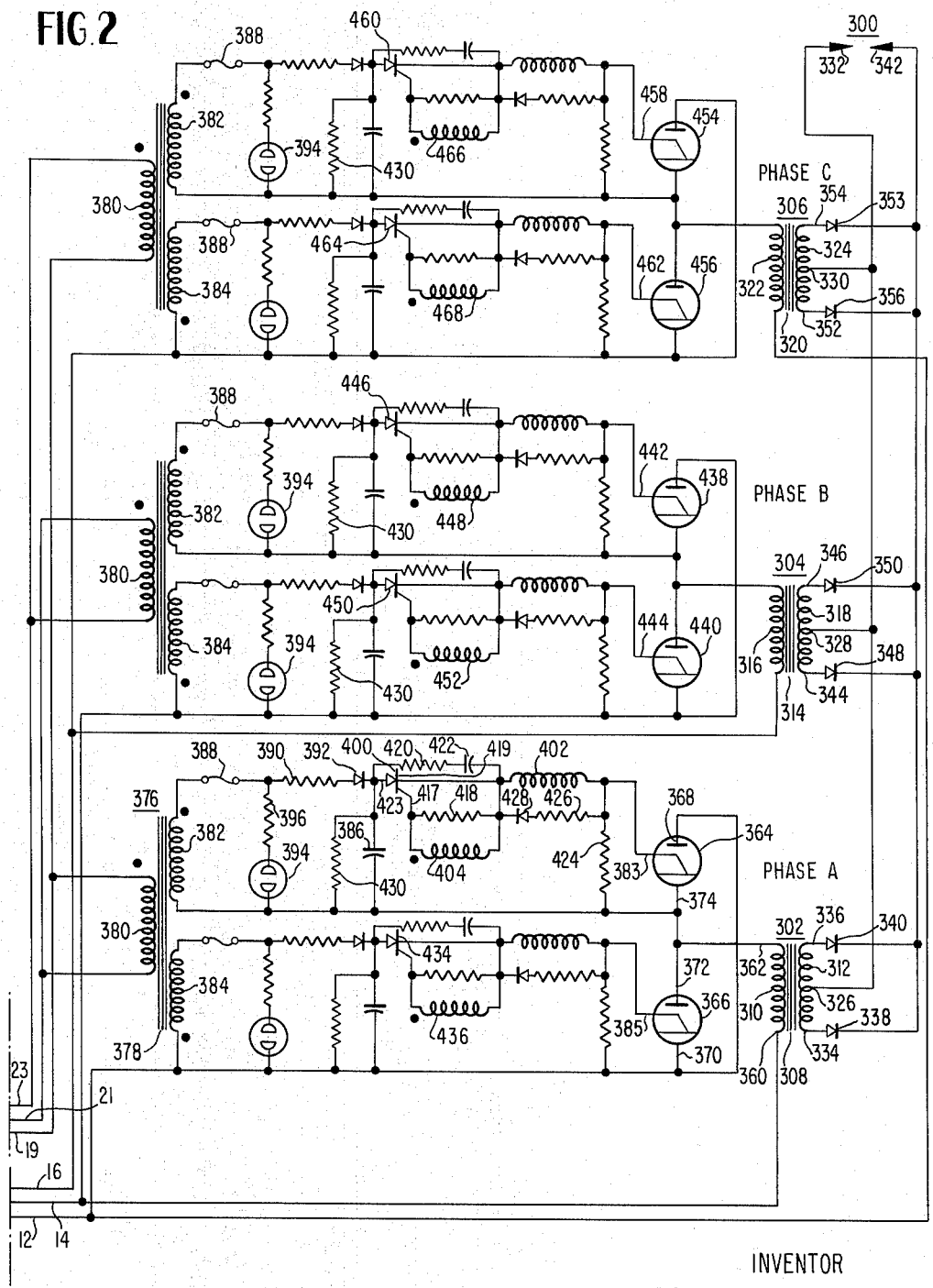
FIG. 2 is a circuit diagram of a circuit for a rectifying three-phase alternating current which utilizes the pulses created in the pulse generating network of FIG. 1.

Referring now to FIG. 2, a typical application of the pulse generating network will be discussed. A pair of welding electrodes 300 are energized by three delta connected single phase transformers 302, 304, 306. Transformer 302 comprises a magnetic core 308, a primary winding 310 and a secondary winding 312. Similarly, transformer 304 comprises a magnetic core 314, a primary winding 316, and a secondary winding 318. Transformer 306 comprises a magnetic core 320, a primary winding 322, and a secondary winding 324.

Secondary windings 312, 318, and 324 are provided with center taps 326, 328, and 330, respectively. These center taps are connected to each other and to electrode 332 of the pair of welding electrodes 300. The end terminals 334 and 336 of secondary winding 312 are connected through a pair of diodes 338 and 340 to the second electrode 342 of the pair of welding electrodes 300. The anodes of both diode 338 and diode 340 are connected to the end terminals 334 and 336, respectively, so that electrodes 300 are provided with unidirectional or D.C. current flow which is from electrode 342 to electrode 332. Similarly, the end terminals 344 and 346 of secondary winding 318 are also connected to electrode 342 through diodes 348 and 350, respectively, and the end terminals 352 and 354 of secondary windings 324 are also connected to electrode 342 through diodes 356 and 358, respectively.

The primary windings 310, 316, and 322 of the three delta connected transformers 302, 304, and 306, respectively, are energized by lines 12, 14, and 16 of the three-phase supply. The voltage appearing between lines 12 and 14 is shown in FIG. 3 as wave A and will therefore be called phase A. Similarly, the voltage between lines 16 and 12 will be called phase B and the voltage between lines 14 and 16 will be called phase C. It will also be convenient to refer to that circuitry associated with transformer 302 as the phase A control circuit and similarly, that with transformer 304 as the phase B control circuit and that with transformer 306 as the phase C control circuit. The primary winding 310 of transformer 302 is energized by lines 12 and 14 or phase A of the three-phase supply. Terminal 360 of primary winding 310 is connected directly to line 14. Terminal 362 of primary winding 310 is connected to line 12 through a pair of ignitrons 364 and 366 which are connected in a back-to-back arrangement. Anode 368 of ignitron 364 and mercury pool cathode 370 of ignitron 366 are connected directly to line 12. Anode 372 of ignitron 366 and mercury pool cathode 374 of ignitron 364 are connected to terminal 362 of primary winding 310. The control circuit for ignitrons 364 and 366 is energized by a transformer 376. Transformer 376 is provided with a magnetic core 378. A primary winding 380 is wound on magnetic core 378 and is energized by lines 19 and 21. Lines 19, 21 and 23 correspond to lines 12, 14, and 16, respectively, differing only in that lines 19, 21, and 23, are fused by fuses 18, 20, and 22, respectively. Transformer 376 is also provided with two secondary windings, 382 and 384. Secondary winding 382 energizes a half wave rectifier circuit which supplies power to the ignitor 383 of ignitron 364. Similarly, power is supplied to ignitor 385 of ignitron 366 by a half wave rectifier circuit energized by secondary winding 384. A capacitor 386 is charged by secondary winding 382 through a fuse 388, a current limiting resistor 390, and a diode 392. Capacitor 386 is charged during the positive half cycle of wave A as can be determined by making reference to the polarity marks on windings 380 and 382. Energization of secondary winding 382 is indicated by a neon bulb 394 which is connected in series with a resistor 396 across the secondary winding 382. The charge developed on capacitor 386 is applied to the ignitor 383 of ignitron 364 through an SCR 400 and an inductor 402. The inductor 402 aids in shaping the pulse applied to ignitor 383.

SCR 400 is fired when a pulse appears in pulse transformer 122. Secondary winding 404 of pulse transformer 122 is connected between the gate 417 and cathode 419 of SCR 400 and in parallel with a resistor 418. For isolation and pulse shaping reasons, it might be desirable to provide an isolation pulse transformer between the secondary winding 404 and the gate 417 and cathode 419 of the SCR 400. Resistor 408 and capacitor 406 are provided to aid in shaping the pulse applied to SCR 400. Resistor 420 and capacitor 422 are connected in series between the anode 423 and cathode 419 of SCR 400 to prevent transient voltage firing of SCR 400. Resistor 424 is connected in parallel with the ignitor 383 and mercury pool cathode 374 to stabilize the ignitor to cathode impedance, thereby insuring reliable firing of the ignitron 364. Resistor 426 and diode 428 are connected in parallel with inductor 402 to prohibit oscillation of the ignitor-cathode circuit comprising the capacitor 386 and the inductor 402. Resistor 426 and diode 428 also prevent the appearance of any induced voltage, due to coupling between this and all other similar inductors, which would tend to increase the potential across SCR 400 which could cause SCR 400 to break down should cathode 419 become negative with respect to ignitor 383. A high resistance resistor 430 is connected in parallel with capacitor 386 to insure the discharge of the capacitor.

Since ignitron 364 is fired and conducts during the positive half-cycle of wave A it is conveniently called the phase A leading ignitron. Ignitron 366, which may be called the phase A lagging ignitron, is controlled by a circuit which is substantially similar to the circuit controlling the phase A leading ignitron 364. The ignitor 385 of ignitron 366 is energized by secondary winding 384 of transformer 376. A pulse is applied to ignitor 385 when SCR 434 is turned on by a pulse appearing in secondary winding 436 of pulse transformer 168.

The phase B and phase C control circuits are substantially similar to those of phase A, including leading and lagging ignitrons. Those circuit components in the phase B and phase C control circuit which are similar to components in the phase A control circuit are assigned the same numeral. Referring now to the phase B control circuit, a leading ignitron 438 and a lagging ignitron 440 are provided with ignitors 442 and 444, respectively. A pulse is applied to the ignitor 442 of the leading ignitron 438 when an SCR 446 is fired by a pulse appearing in a secondary winding 448 of pulse transformer 208. This pulse causes ignitron 438 to conduct until the phase B voltage reverses. Similarly, lagging ignitron 440 is fired when a pulse is applied to ignitor 444 by the firing of an SCR 450 by a pulse appearing in a secondary winding 452 of pulse transformer 216.

Phase C is provided with a leading ignitron 454 and a lagging ignitron 456. The energization of the ignitor 458 of ignitron 454 is controlled by an SCR 460, while the energization of the ignitor 462 of ignitron 456 is controlled by an SCR 464. SCR 460 is fired by a pulse appearing in secondary winding 466 of pulse transformer 250. SCR 464 is fired by a pulse appearing in secondary winding 468 of pulse transformer 242.

Referring to the wave forms of phases A, B, and C and the pulses in FIG. 3, and to the welding control circuit in FIG. 2, the voltage applied to the welding electrodes 300 will be understood. Ignitron 364 begins to conduct when a pulse is formed in pulse transformer 122, this pulse being indicated by line 190 in FIG. 3. Therefore, the phase A voltage is applied to winding 310 beginning at the point 188 and continuing until the phase reverses. The portion of the phase A voltage applied is indicated by the shaded portion 470 in FIG. 3. Lagging ignitron 366 begins to conduct when a pulse appears in pulse transformer 168, this pulse being indicated by line 194 in FIG. 3. Thereafter, the phase A voltage is applied to the primary winding 310 beginning at the point 192 and continuing until the phase voltage reverses. This portion of the phase A voltage is indicated by the shaded area 472.

Referring now to phase B, it will be seen that ignitron 438 conducts when a pulse appears in pulse transformer 208. A pulse in pulse transformer 208 is indicated by the line 224. This pulse appears at point 222 on the phase B voltage. That portion of the phase B voltage shown as shaded area 474 is applied to the primary winding 316 of transformer 304. The phase B lagging ignitron 440 is fired when a pulse appears in pulse transformer 216. Such a pulse is indicated by line 228 in FIG. 3. This pulse appears at point 226 on the phase B voltage. The voltage indicated by the shaded portion 480 is applied to primary winding 316 of transformer 304. The shaded portion 480 indicated on the left of the figure assumes firing of ignitron 440 during the cycle preceding that shown.

The lagging ignitron 456 of phase C is fired when a pulse appears in pulse transformer 242. Such a pulse is represented by line 258 in FIG. 3. Ignitron 456 begins to conduct at point 256 of voltage wave form of phase C. The voltage applied to the primary winding 322 of transformer 306 is indicated by the shaded portion 476 of the phase C voltage. The leading ignitron 454 of phase C is fired when a pulse appears in pulse transformer 250. Such a pulse is represented by line 262 in FIG. 3. Pulse 262 occurs at point 260 on the phase C voltage wave form. The voltage applied to the primary winding 322 of transformer 306 is that indicated by the shaded portion 478 of the phase C voltage wave form. The shaded portion 478 on the left assumes that ignitron 454 conducted during the cycle preceding that shown.

Whereas the voltage applied to the welding electrodes 300 is rectified, it can be considered to be the sums of the voltages represented by the shaded areas 470 through 480, all of the areas being considered positive areas. Referring again to FIG. 1, it will be seen that by varying the time delay of the firing of unijunction transistor 76 by first varying the position of the tap on potentiometer 68, and then varying the position of the tap 70 on potentiometer 68, it is possible to vary the position on the wave forms at which the pulses are applied to the ignitrons. Varying the time delay of the pulses varies the total volt seconds as represented by the areas 470 to 480 applied to the transformers 302, 304, and 306, and thereby varies the D.C. voltage applied to the welding contacts 300.

While a particular embodiment of the invention has been shown, other embodiments of the invention will be apparent to those skilled in the art, and it is intended to cover by the appended claims all embodiments falling within the scope thereof.

What I claim as new and desire to secure by Letters Patent of the United States is:

1. A pulse generating network comprising:
    (a) a master pulse generating circuit including,
        (i) a first time delay means, and
        (ii) a first pulse generating means controlled by said first time delay means, and producing a pulse after a first predetermined time interval, and
    (b) a slave pulse generating circuit including,
        (i) a second time delay means,
        (ii) a second pulse generating means, said second time delay means and said second pulse generating means being energized in response to a pulse being formed in said first pulse generating means in said master pulse generating circuit, and
        (iii) a third pulse generating means, the energization of said third pulse generating means being controlled by said second time delay means, said third pulse generating means energized after a second predetermined time delay following the pulse being formed in said first pulse generating means, whereby said second and third pulse generating means produce pulses spaced by a second predetermined time interval.

2. A pulse generating network comprising:
    (a) a master pulse generating circuit including,
        (i) a first solid state time delay means, and
        (ii) a first pulse generating means including a first transistor connected in series with a primary winding of a first pulse transformer, said first transistor being caused to conduct by said first time delay means after a first predetermined time interval following energization of said master pulse generating circuit, so as to form a pulse in said primary winding,
    (b) a slave pulse generating circuit including,
        (i) a second solid state time delay means,
        (ii) a second pulse generating means connected in series with said second time delay means,
        (iii) a normally open switching means connected in series with said second time delay means and said second pulse generating means, said switching means being closed when a pulse is formed in said first pulse generating means after a first predetermined time interval, a pulse being immediately formed in said second pulse generating means,
        (iv) a third pulse generating means including a second transistor connected in series with a primary winding of a second pulse transformer, said second transistor being caused to conduct so as to form a pulse in said primary winding of said second pulse transformer by said second time delay means at a second predetermined time interval after the closing of said switching means, whereby said second and third pulse generating means produce pulses spaced by a second predetermined time interval.

3. A pulse generating network comprising:
(a) a master pulse generating circuit including,
   (i) a first D.C. reference voltage source,
   (ii) a first time delay means comprising a first unijunction transistor relaxation oscillator including a first unijunction transistor having an emitter, a first base, and a second base, said bases being energized by said first D.C. reference voltage source, an R-C timing circuit energized by said first D.C. reference source and determining said emitter voltage, said R-C timing circuit including a variable resistor for controlling the charging time of a capacitor in said R-C timing circuit, said first unijunction transistor conducting when said capacitor is charged to a predetermined voltage, after a first predetermined time interval,
   (iii) a first pulse generating means including a first transistor connected in series with a primary winding of a first pulse transformer across said first D.C. reference voltage source,
   (iv) a means connecting said first base of said first unijunction transistor to an electrode of said first transistor so that when said first unijunction transistor conducts said first transistor is caused to conduct so as to form a pulse in said primary winding of said first pulse transformer, at a first predetermined time interval after energization of said first time delay means by said first D.C. reference voltage source, and
   (v) a first secondary winding on said first pulse transformer connected to a means for shorting said first D.C. reference voltage source, so that said first time delay means is de-energized,
(b) a D.C. supply voltage source, and
(c) a slave pulse generating circuit including,
   (i) a second D.C. reference voltage source, a primary winding of a second pulse transformer, and a normally open switching means connected in series across said D.C. supply voltage source,
   (ii) a second secondary winding on said first pulse transformer connected to energize means for closing said switching means when a pulse is formed in said master pulse generating circuit, a pulse being immediately formed in said primary winding of said second pulse transformer, and said second D.C. reference voltage source being energized when said normally open switching means is closed,
   (iii) a second time delay means comprising a second unijunction transistor having an emitter, a first base, and a second base, said bases being energized by said second D.C. reference voltage source, an R-C timing circuit energized by said second D.C. reference source and determining said emitter voltage, said R-C timing circuit including a variable resistor for controlling the charging time of a capacitor in said R-C timing circuit, said second unijunction transistor conducting when said capacitor is charged to a predetermined voltage, after a second predetermined time interval,
   (iv) a second pulse generating means including a second transistor connected in series with a primary winding of a third pulse transformer across said second D.C. reference voltage source,
   (v) a means connecting said first base of said second unijunction transistor to an electrode of said second transistor, so that when said second unijunction transistor conducts said second transistor is caused to conduct so as to form a pulse in said primary winding of said third pulse transformer at a second predetermined time interval after the closing of said normally open switching means, the pulses formed in said second and third pulse transformers being spaced by a second predetermined time interval, and
   (vi) a secondary winding on said third pulse transformer connected to a means for opening said normally open switching means, so as to de-energize said second D.C. reference voltage source, so that said second time delay means is de-energized.

4. A pulse generating network comprising:
(a) a master pulse generating circuit including,
   (i) a first time delay means, and
   (ii) a first pulse generating means controlled by said first time delay means, and producing a pulse after a first predetermined time interval, and
(b) a first slave pulse generating circuit including,
   (i) a second time delay means,
   (ii) a second pulse generating means, said second time delay means and said second pulse generating means being energized in response to a pulse being formed in said first pulse generating means in said master pulse generating circuit, and
   (iii) a third pulse generating means, the energization of said third pulse generating means being controlled by said second time delay means, said third pulse generating means energized after a second predetermined time delay following the pulse being formed in said first pulse generating means, and
(c) a second slave pulse generating circuit including,
   (i) a third time delay means, being energized in response to a pulse being formed in said second pulse generating means in said first slave pulse generating circuit, and
   (ii) a fourth pulse generating means, the energization of said fourth pulse generating means being controlled by said third time delay means, said fourth pulse generating means energized after a third predetermined time delay following the pulse being formed in said first pulse generating means, whereby said second, third, and fourth pulse generating means produce three spaced pulses, the first and second spaced by a second predetermined time interval and the first and third spaced by a third predetermined time interval.

5. A pulse generating network as defined in claim 4 and further including a third slave pulse generating circuit including:
(a) a fourth time delay means,
(b) a fifth pulse generating means, said fourth time delay means and said fifth pulse generating means being energized in response to a pulse being formed in said fourth pulse generating means in said second slave pulse generating circuit, and
(c) a sixth pulse generating means, the energization of said sixth pulse generating means being controlled by said fourth time delay means, said sixth pulse generating means energized after a fourth predetermined time interval following the pulse being formed in said first pulse generating means, whereby said second, third, fifth, and sixth pulse generating means produce four spaced pulses, the first and second spaced by a second predetermined time interval, the first and third spaced by a third predetermined time interval, and the first and fourth spaced by a fourth predetermined time interval.

6. A pulse generating network as defined in claim 5 and further including a plurality of pairs of successive slave pulse generating circuits, each pair of successive slave pulse generating circuits including:
(a) a slave pulse generating circuit substantially the same as said second slave pulse generating circuit, and being energized in response to a pulse being formed in said second pulse generating means in said first slave pulse generating circuit, and
(b) an additional slave pulse generating circuit substantially the same as said first and third slave pulse generating circuits and being energized in response to a pulse formed in the first slave pulse generating circuit of said pair of slave pulse generating circuits, whereby said additional slave pulse generating circuit of each pair of successive slave pulse generating circuits produces a pair of pulses, each of which is spaced by a predetermined time interval from the first pulse.

No references cited.

ARTHUR GAUSS, *Primary Examiner.*